(12) United States Patent
Crona

(10) Patent No.: US 9,183,457 B2
(45) Date of Patent: Nov. 10, 2015

(54) SHADOW DETECTION IN A MULTIPLE COLOUR CHANNEL IMAGE

(71) Applicant: Kapsch TrafficCom AB, Jönköping (SE)

(72) Inventor: Björn Crona, Jönköping (SE)

(73) Assignee: Kapsch TrafficCom AB, Jönköping (SE)

( * ) Notice: Subject to any disclaimer, the term of this patent is extended or adjusted under 35 U.S.C. 154(b) by 0 days.

(21) Appl. No.: 14/321,680

(22) Filed: Jul. 1, 2014

(65) Prior Publication Data

US 2015/0010232 A1    Jan. 8, 2015

(30) Foreign Application Priority Data

Jul. 3, 2013 (EP) ..................................... 13174968

(51) Int. Cl.
*G06K 9/00* (2006.01)
*G06K 9/46* (2006.01)
*G06T 7/40* (2006.01)
*G06K 9/62* (2006.01)
*G06T 7/00* (2006.01)

(52) U.S. Cl.
CPC ............ *G06K 9/4652* (2013.01); *G06K 9/6267* (2013.01); *G06T 7/0081* (2013.01); *G06T 7/408* (2013.01); *G06T 2207/30236* (2013.01)

(58) Field of Classification Search
CPC ..... G06K 9/4652; G06K 9/6267; G06T 7/408
USPC ........................................................ 382/165
See application file for complete search history.

(56) References Cited

U.S. PATENT DOCUMENTS

| 2003/0152285 | A1* | 8/2003 | Feldmann et al. | 382/274 |
| 2006/0045330 | A1* | 3/2006 | Marion | 382/162 |
| 2008/0285859 | A1* | 11/2008 | Lei et al. | 382/224 |
| 2009/0316957 | A1* | 12/2009 | Chen et al. | 382/104 |

(Continued)

OTHER PUBLICATIONS

Surkutlawar et al. ("Shadow Suppression using RGB and HSV Color Space in Moving Object Detection," Int'l J. of Advanced Computer Science and Applications, vol. 4, No. 1, 2013, pp. 164-169).*

(Continued)

*Primary Examiner* — Yubin Hung
(74) *Attorney, Agent, or Firm* — Finala & Weaver P.L.L.C.

(57) ABSTRACT

A method for shadow detection in an image comprising multiple color channels is disclosed wherein said image is compared with a background image. Said image and said background image comprises the same multiple color channels, have an exposure of a common background and are divided into a plurality of corresponding evaluation areas. For each combination of two color channels, a shadow region is defined in the two-dimensional coordinate system spanned by the two color channels. For each image evaluation area to be evaluated and for each combination of two color channels, the method comprises checking if a difference value between a first value pair defining values of said two color channels in the image evaluation area and a second value pair defining the values of said two color channels in the corresponding background evaluation area falls within said shadow region in said coordinate system.

13 Claims, 4 Drawing Sheets

(56) References Cited

U.S. PATENT DOCUMENTS

2010/0111362 A1* 5/2010 Huang et al. .................. 382/103
2010/0232705 A1* 9/2010 Li et al. ......................... 382/195

OTHER PUBLICATIONS

Sanin et al. ("Shadow Detection—A Survey and Comparative Evaluation of Recent Methods," Journal Pattern Recognition, vol. 45, Issue 4, Apr. 2012, pp. 1684-1695).*

Jyothisree et al. ("Shadow detection using tricolor attenuation model enhanced with adaptive histogram equalization," Int'l J. of Computer Science and Information Technology, vol. 5, No. 2, Apr. 2013, pp. 147-155).*

Sun et al. ("Moving Cast Shadow Detection of Vehicle Using Combined Color Models," Chines Conference on Pattern Recognition, Oct. 21-23, 2010, pp. 1-5).*

Horprasert et al. ("A Robust Background Subtraction and Shadow Detection," Proceedings of the Asian Conference on Computer Vision, Taipei, Taiwan, Jan. 2000.*

Extended European Search Report received for European Patent Application No. 13174968.1, mailed on Dec. 12, 2013, 6 pages.

Kumar et al., "A Comparative Study of Different Color Spaces for Foreground and Shadow Detection for Traffic Monitoring System", Intelligent transportation systems, The IEEE 5th international conference, Sep. 3, 2002, pp. 100-105.

Jones et al., "Statistical Color Models with Application to Skin Detection", International Journal of Computer Vision, vol. 46, No. 1, Jan. 2002, pp. 81-86.

Stauffer et al., "Adaptive Background Mixture Models for Real-Time Tracking", Proceedings of the 1999 IEEE computer Society conference on computer vision and Pattern recognition, vol. 2, No. 23, Jun. 1999, pp. 246-252.

* cited by examiner

SHADOW DETECTION IN A MULTIPLE COLOUR CHANNEL IMAGE

CROSS-REFERENCE TO RELATED APPLICATION(S)

This application claims priority to European Patent Application No. 13 174 968.1, filed on Jul. 3, 2013, the entirety of which is incorporated by reference herein.

BACKGROUND

1. Technical Field

The present subject matter relates to a method for shadow detection in a multiple colour channel image and to a traffic surveillance facility utilizing a method for shadow detection in a multiple colour channel image. The present subject matter may, for example, be advantageous in the field of computer vision, more specifically in the process of segmenting a foreground from a stationary background.

2. Background Art

Many image analysis applications, e.g. in traffic surveillance, include dividing an image into a foreground and a background. In traffic surveillance, the foreground is normally a passing vehicle that is to be detected, tracked or identified and the background, such as a roadway, is usually known. However, if a foreground object casts shadows on the background, these shadows are often incorrectly detected as part of the foreground object instead of as part of the background. Such incorrect segmentation of foreground and background may cause problems e.g. in the process of tracking vehicles.

A known method of detecting shadows in colour images is to define a shadow interval for each colour channel relative to the background, i.e. to define an interval of deviation from each background colour channel value corresponding to a shadowed background. Usually, the three dimensional hue-saturation-lightness (HSL) colour space is used, or sometimes the red-green-blue (RGB) colour space. The shadow intervals can be set manually or by an algorithm that calculates the most suitable interval values from a large number of test images in which regions manually have been marked as shadow or non-shadow. A region or pixel in the image is classified as shadow if each of its colour channel values falls within the defined shadow threshold of that colour channel.

However, even if the shadow intervals are thoroughly and very carefully selected, this approach does not result in perfect shadow detection—the box in three-dimensional colour space that results from the shadow interval defined in each colour channel does not correspond very well to the usually irregular, elongated worm-shape of the true shadow volume. Hence, the method of defining a shadow interval for each colour channel always leaves a trade-off between incorrectly classifying part of the foreground pixels as shadow and incorrectly classifying shadow as foreground. One solution could be to instead define and use a three-dimensional shadow volume in three-dimensional colour space, since a three-dimensional volume has the ability to provide an exact reflection of the true shadow volume. The three-dimensional shadow volume could be found by analysing a large number of test images where regions manually have been marked as shadow or non-shadow. However, storing the three-dimensional shadow volume would be a problem for today's computers—a three-dimensional lookup table with reasonable resolution would become extremely large, larger than what is manageable by today's standard computers. An alternative which requires less storage space than a three-dimensional lookup table is to store the shadow volume as a mathematical expression. However, mathematical descriptions such as spheres or ellipsoids cannot entirely reflect the typical irregular worm-shape of true shadow volumes and would hence lead to misclassifications.

BRIEF SUMMARY

There is thus a need for a shadow detecting method with improved distinction between shadow and foreground in multiple colour channel images.

An object of the present subject matter is to provide a method for shadow detection in an image comprising multiple colour channels where the previously mentioned problem is at least partly avoided. This object is achieved by the features of the characterising portion of claim 1.

The present application discloses a method for shadow detection in an image comprising multiple colour channels, wherein said image is compared with a background image. Said image and said background image:
- have an exposure of a common background,
- are divided into a plurality of image and background image evaluation areas respectively, each image evaluation area having a corresponding background image evaluation area covering the same area of said common background, and
- comprises the same multiple colour channels.

Each possible combination of two colour channels in said image is identified, each combination of two colour channels defining a two dimensional coordinate system. A shadow region is defined in each of said coordinate systems. For each image evaluation area to be evaluated the method comprises the steps of:
- for each combination of two colour channels:
  - identifying a first value pair defining the values of said two colour channels in the image evaluation area,
  - identifying a second value pair defining the values of said two colour channels in the corresponding background evaluation area,
  - checking if a difference value between said first and second value pairs falls within said shadow region in said coordinate system,
- classifying the image evaluation area as shadow if the difference value falls within the shadow region for all combinations of two colour channels, and
- classifying the image evaluation area as non-shadow if the difference falls outside the shadow region for any of the combinations of two colour channels.

In other words, the image in which shadow is to be detected is compared with a background image. The background image is a capture of the same geographical area as the image in which shadow is to be detected, but in the background image foreground objects that possibly cast shadows to be detected are not present. Simply put, the background image shows only the substantially stationary background. The image and the background image are divided into equal numbers of evaluation areas. Each evaluation area in the image has a corresponding evaluation area in the background image, such that two corresponding evaluation areas depict the same geographical area of reality. In order to identify shadow, an evaluation area of the image is compared to its corresponding background image evaluation area. But instead of evaluating each colour channel independently, as in the art, this method uses colour channel dependencies.

Defining a shadow interval for each colour channel independently, as in the art, is equivalent to defining a shadow box, i.e. a rectangular cuboid shape, in the three dimensional coordinate system spanned by the three colour channels. However, a box is a poor approximation of the true three-dimensional shadow volume, since true shadow volumes usually are worm-shaped, i.e. they have an irregular elongated shape. Consequently, certain colour channel values will inevitably be misclassified if independent shadow intervals for each colour channel are defined. An idea of the present subject matter is to instead use colour channel dependencies for shadow classification. For each combination of two colour channels, a two-dimensional shadow region is defined in the two-dimensional coordinate system spanned by the two colour channels. Hence, with three different colour channels, three different two-dimensional shadow regions are defined. Together, said three two-dimensional shadow regions constitute an approximation of the true three-dimensional shadow volume which is a much closer reconstruction of the true worm-shaped shadow volume than the known box approximation. For each pair of colour channels, it is checked if the difference between the colour channel value pair of the image and background image area falls within the two-dimensional shadow region. If the answer is yes for all combinations of colour channels, then the image evaluation area is classified as shadow. Otherwise, it is classified as non-shadow, i.e. as foreground or background. An advantage of the present subject matter is that it provides much more reliable shadow classification than previous shadow detection methods—a fewer number of evaluation areas are misclassified. Also, using three two-dimensional shadow regions keep the amount of data and computations at reasonable levels that are easily handled by today's normal capacity computers. Contrary to most known methods, the disclosed method works roughly equally well in RGB colour space as in HSL colour space. Since digital colour cameras and video cameras generally output images in RGB colour space, the disclosed method does not require time-consuming conversion calculations which provides a further advantage. However, the present subject matter could be used in any colours space, also with more than three colour channels, such as CMYK (cyan, magenta, yellow and key (black)) or multispectral images.

Each evaluation area may, for example, be an individual pixel. Pixels are the smallest elements in digital images, and consequently shadow classification at pixel level provides shadow detection with highest possible resolution. Furthermore, a digital image is delivered from the camera as a set of colour channel values for each pixel. If an evaluation area is constituted by several pixels, average colour channel values for the entire evaluation area have to be computed before the shadow detection can start. With each evaluation area constituted by an individual pixel, such computations are not required. It is also possible to define each evaluation area as any combination of several pixels, for example bundles of two, four or sixteen individual pixels, as long as the evaluation areas are defined correspondently in the image and background image. However, if the evaluation areas are too large, one single evaluation area may possibly contain both shadow, foreground and/or background pixels which results in poor shadow detection. The size of the evaluation areas may, for example, be limited such that a majority of the evaluation areas substantially contains only shadow, foreground or background pixels. It is also possible to calculate subpixels, i.e. areas smaller than a pixel, and define each evaluation area as such a subpixel.

The method may comprise evaluating each image evaluation area contained in the image. In this way, every shadow comprised in the image may be detected.

The shadow region for each combination of two colour channels may be stored in a two-dimensional lookup table. A lookup table is an indexed array of data. For each combination of values of the two colour channel, the lookup table contains an element indicating "shadow" or "non-shadow". Two-dimensional lookup tables provide simple and fast access to the stored shadow regions. With today's technology, the lookup tables may, for example, have the dimensions of 256×256 elements, since 256 is the number of possible values in each colour channel in 8-bit colour images. However, if memory capacity is limited, the lookup tables may be reduced to dimensions of 128×128 or 64×64 elements. In such case, adjacent colour channel values are grouped and represented by a common shadow indication element in the lookup table, resulting in somewhat lower resolution of the shadow detection. It is also possible to increase the dimensions of the lookup tables if using colour channels with a larger number of possible values. An alternative to two-dimensional lookup tables would be storing the shadow regions as mathematical expressions.

The method may further comprise that the image is captured by a stationary camera and that the background image is an average, a median or a peak of a predetermined number of previous images captured by said stationary camera. Here, peak refers to the most frequent image of the previous image. Capturing the image to be analysed and the background images with the same stationary camera guarantees that the image and the background image have an exposure of a common background, i.e. they cover the same geographical area. It is also possible to use a plurality of different background images, for example to switch between a sunny background image and a cloudy background image.

As an example, the background image should only depict the stationary background. Temporary objects, such as passing vehicles, are undesirable in the background image. The advantage of creating the background image by averaging a predetermined number of previous images is that the influence of white noise is reduced as well as the effect of any temporary objects, since the temporary objects due to their temporary nature only appear in some of the previous images.

The background image may be created by averaging at least 500 previous images, and more specifically at least 1000 images. The larger number of previous images, that are averaged, the less influence of temporary objects in the resulting background image. If it is ascertained that no disturbances such as temporary objects are present, it would also be possible to use less than 500 previous images for creating the background image. In principle, the background image could be created from one single previous image.

Furthermore, the background image may be continuously updated. With continuous update, the background image is adapted to prevailing ambient conditions. For example, the shadow cast by a stationary roadside lamppost should be conceived as background and should thus be comprised in the background image. Throughout the day, the shadow cast by the lamppost moves as the sun moves over the sky. By continuously updating the background image, the position of the lamppost shadow can be correctly represented in the background image.

In one example, the background image is updated at predetermined time intervals by replacing the oldest previous image by a newly captured image in the averaging of previous images. In this way, the background image is successively updated. For example, if collected from 1000 previous images and updated once every second, the background image reflects the past 1000 seconds, i.e. approximately 17 minutes. Updating one previous image in the averaged background image every second provides a good balance between reflecting a fair amount of past time in the background image while limiting the work of computing new, updated background images.

The two-dimensional shadow regions used in the disclosed method may be automatically constructed from a plurality of previous images where the shadow regions are predetermined. As an example, regions are manually marked as shadow or non-shadow in a large number of test images. A computer analyses all the test images with marked shadow and non-shadow regions and constructs the two-dimensional shadow regions for all combinations of two colour channels. For example, this could be done by storing all the colour channel values comprised in marked shadow regions in lookup tables for each combination of two colour channels and then using an algorithm which creates a surface that encloses all the stored shadow values. Said algorithm may comprise a convex hull (may render somewhat too large areas), a concave hull, or dilate followed by erode. All of these techniques are known to a person skilled in the art.

Alternatively, the shadow regions are manually constructed. By creating a large data set of predetermined shadows in images from the system, a true shadow volume can be defined. Images taken by the system are manually processed by e.g. an operator, which graphically marks shadow regions in a large plurality of individual images from the surveillance system. All the pixels that thereby are marked are used to construct the shadow volumes. If a pixel defined as shadow, in the marked images, is found to be outside of the already existing two-dimensional shadow region, the shadow region is expanded to absorb also the new pixel.

The growth of a shadow region may, for example, be done by a smooth structure element such as a circle. This could be achieved by the morphological operations dilate and then erode with a circle like structure element (common image processing technique).

To not have the shadow regions expand too much also non-shadow regions could be marked by the operator. In cases where non-shadow pixels are present inside the shadow volume, the volume is reduced. This is done by analyzing in which of the (usually) three two-dimensional regions the pixel is closest to the border. In this region a smooth reduction is done, in a similar way expansion is performed.

An operator may, for example, be continuously provided with feedback of which areas the system classifies as shadow. By continuously monitor the detection of shadow regions it is possible to expand and reduce the volume by marking new shadows or marking false shadows. It is however not necessary to always perform a manual marking of shadow regions. When an operator has performed the update of the shadow regions for different weather and vehicle conditions the shadow volume is a very good representation of real shadows with extreme low false positives.

The disclosed shadow detection method may further comprise a post-processing step of comparing an evaluation area to its neighbouring evaluation areas and correcting its shadow classification if its neighbourhood suggests misclassification. The purpose of this step, which is a filtering step, is to remove unevenness in the evaluated images. A single evaluation area, e.g. a pixel, classified as non-shadow surrounded by a multitude of evaluation areas classified as shadow has most probably been misclassified. The filtering step corrects these probable misclassifications, and hence improves the shadow detection. There are several known filtering methods that can be used for this purpose, for example median filtering.

The disclosure also concerns a traffic surveillance facility provided with a multiple colour channel camera, characterised in that shadow detection is carried out according to the method described above. This provides improved shadow detection in the images captured by the camera and hence improved automatic detection and tracking of passing vehicles. This is advantageous since automatic detection and tracking of vehicles plays an important role in automatic traffic surveillance facilities. Examples of traffic surveillance facilities are law enforcement facilities, tunnel surveillance, road toll facilities, and any other type of traffic surveillance.

BRIEF DESCRIPTION OF THE DRAWINGS/FIGURES

In the detailed description of the invention given below reference is made to the following schematic figures, in which.

DETAILED DESCRIPTION

Figure 1:
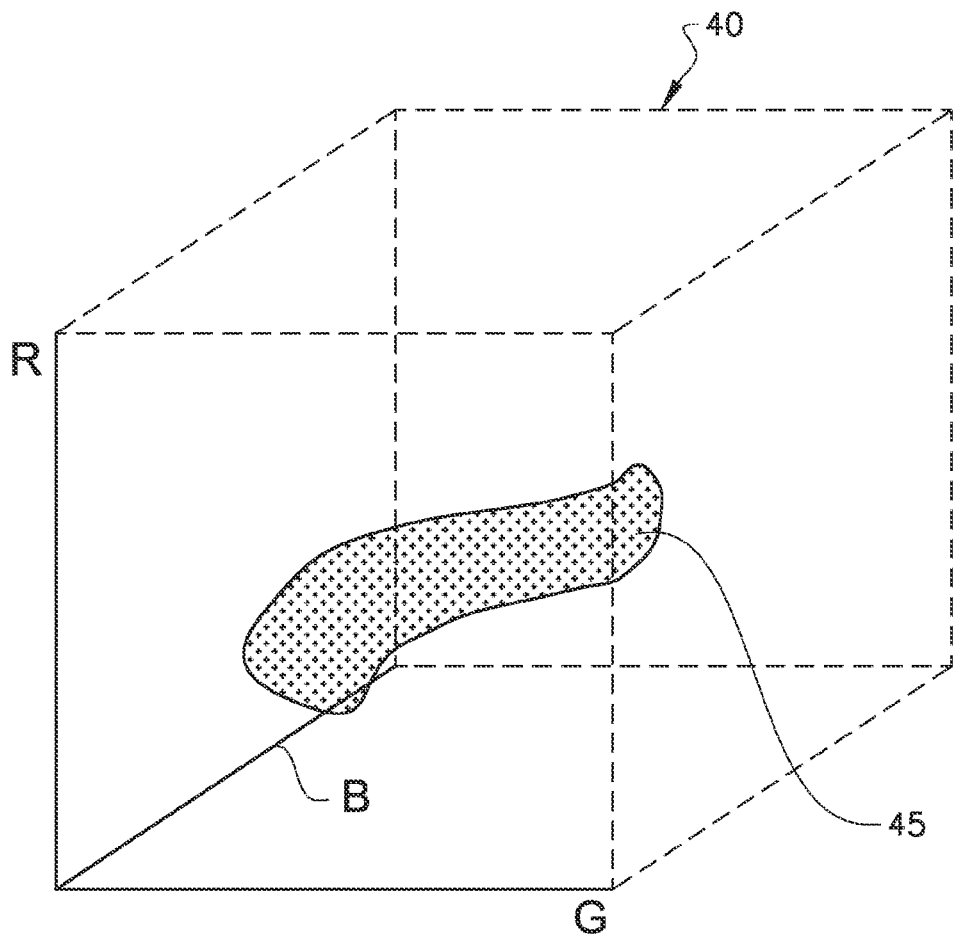
FIG. 1 shows a schematic example of a true shadow volume in three-dimensional RGB colour space.

Various aspects of the present subject matter will hereinafter be described in conjunction with the appended drawings to illustrate but not to limit the present subject matter. In the drawings, one embodiment is shown and described, simply by way of illustration of one mode of carrying out the present subject matter. In the drawings, like designations denote like elements. Variations of the different aspects are not restricted to the specifically shown embodiment, but are applicable on other variations of the present subject matter.

FIG. 1 shows a schematic example of a true shadow volume 45 in three-dimensional RGB colour space. The three-dimensional space 40 is spanned by the colour channels red R, green G, and blue B. Typically, if 8-bit colour graphics is used, each colour channel can take integer values between 0 and 255, i.e. 256 different values. A region under shadow becomes darker than a corresponding non-shadowed region as it is blocked from the illumination source. For a background region of a given colour, the colour channel values of a region under shadow fall within a shadow volume 45. This true shadow volume 45 can be localised by registering the colour channel values of manually identified shadowed regions of said background in a large number of images. In order to obtain accurate automatic shadow detection, it would be desirable to use the true shadow volume—pixels that fall within the true shadow volume should be identified as shadow. However, the usually worm- or boomerang-shaped three-dimensional shadow volume 45 is difficult to accurately describe mathematically, and storing it in a three-dimensional lookup table would require more storage space than provided in today's computers for reasonable costs. A solution is to make an approximation of the shadow volume. A common, known method is to define a shadow interval for each colour channel independently. This is equivalent to defining a shadow box, i.e. a rectangular cubic shape, in the three dimensional coordinate system spanned by the three colour channels 40. If the box is to completely enclose the true shadow volume 45, it will inevitably also enclose other colour channel values that should not be identified as shadow due to the poor matching in shape between the box and the true shadow volume 45. If the box is made smaller, in order to decrease the risk of non-shadow pixels being incorrectly identified as shadow, parts of the true shadow volume will extend beyond the box and there will instead be a risk of identifying shadow pixels as foreground or non-shadow. The idea of the disclosed method is to instead use colour channel dependencies for shadow classification, as described in connection with FIG. 2.

Figure 2A:
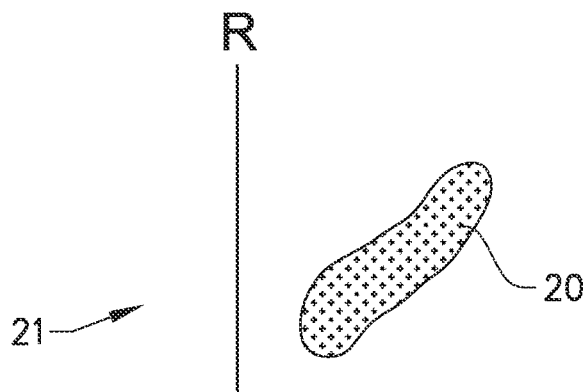
FIG. 2a shows an example of a two-dimensional shadow region in red-green space.
Figure 2B:
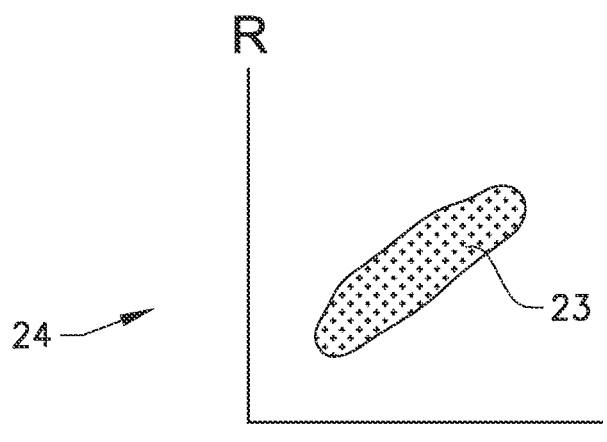
FIG. 2b shows an example of a two-dimensional shadow region in red-blue space.
Figure 2C:
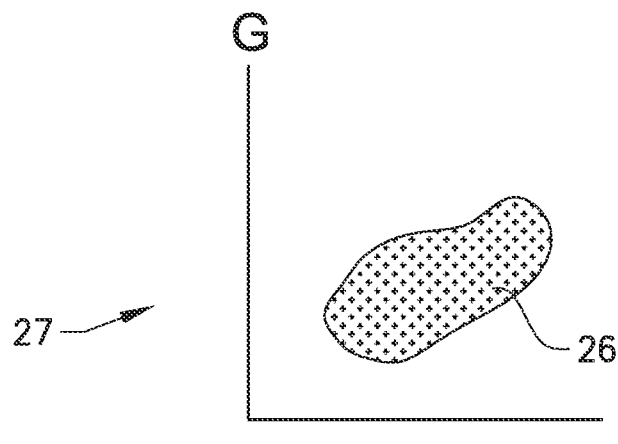
FIG. 2c shows an example of a two-dimensional shadow region in green-blue space.

FIGS. 2a-2c show examples of two-dimensional shadow regions. For each combination of two colour channels, a two-dimensional shadow region 20, 23, 26 is defined in the two-dimensional coordinate system 21, 24, 27 spanned by the two colour channels. FIG. 2a shows an example of a shadow region 20 in the two-dimensional coordinate system 21 spanned by the colour channels red R and green G. FIG. 2b shows an example of a shadow region 23 in the two-dimensional coordinate system 24 spanned by the colour channels red R and blue B. FIG. 2c shows an example of a shadow region 26 in the two-dimensional coordinate system 27 spanned by the colour channels green G and blue B. This is equivalent to approximating the three-dimensional true shadow volume 45 by three two dimensional areas, resulting in a much closer reconstruction of the true worm- or boomerang-shaped true shadow volume 45 than the previously known box approximation. In order to classify an evaluation area as shadow, its colour channel values has to fall within the shadow region 20, 23, 26 for all combinations of two colour channels.

Figure 3:
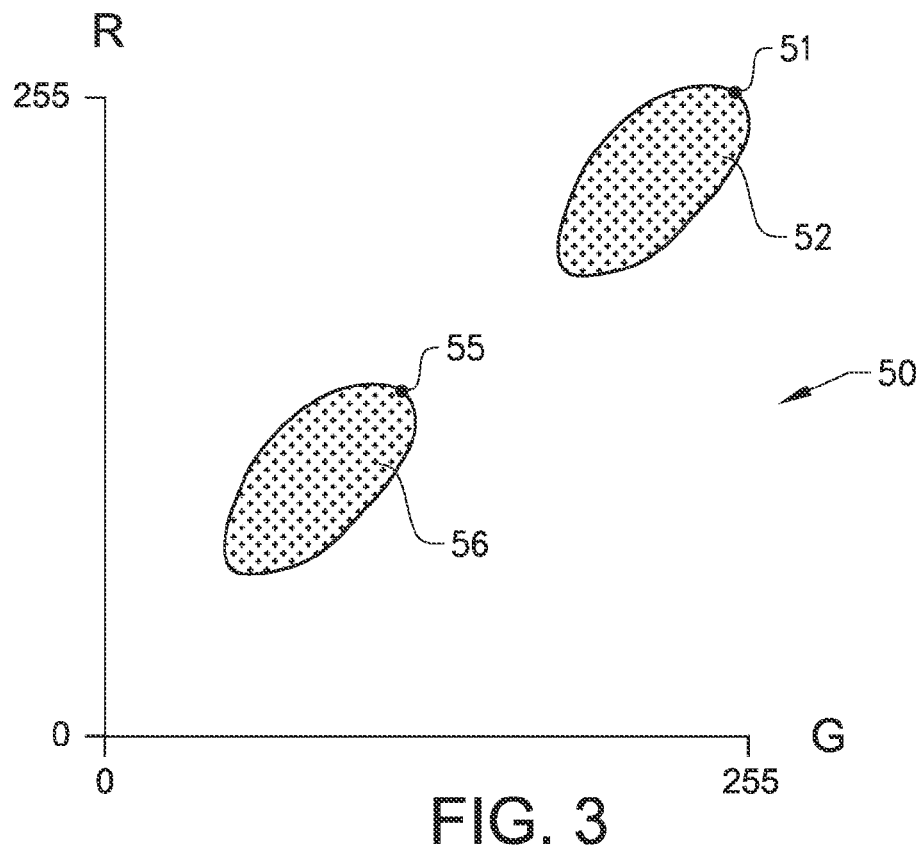
FIG. 3 shows an example of absolute shadow regions in red-green space.

FIG. 3 shows an example of shadow regions 52, 56 in absolute red-green space 50. In this example, the colour channels red R and green G can take integer values between 0 and 255. FIG. 3 illustrates that a shadow region depends on the colour of the corresponding non-shadowed object. For example, a white road marking under shadow is not nearly as dark as asphalt under shadow. A bright pixel 51 with high colour channel values, representing for example a white road marking, has a shadow region 52 comprising quite high colour channel values, while a darker pixel 55 with low colour channel values, representing for example asphalt, has a shadow region 56 comprising even lower colour channel values. Thus, shadow regions are not universal, but depend on the colour of the underlying object. But as can be seen in FIG. 3, the shapes of the different shadow regions 52, 56 are substantially identical. Hence, one can define a relative shadow region, i.e. relative to the colour of the underlying object, which is substantially universal for all background colours. In applications where the shadows of passing objects, such as vehicles, are to be detected, one can utilize a background image where the passing object is not present. By subtracting the background image from the image in which shadow is to be detected, it is then possible to check the relative colour channel values against the relative shadow regions in order to identify shadow.

Figure 4:
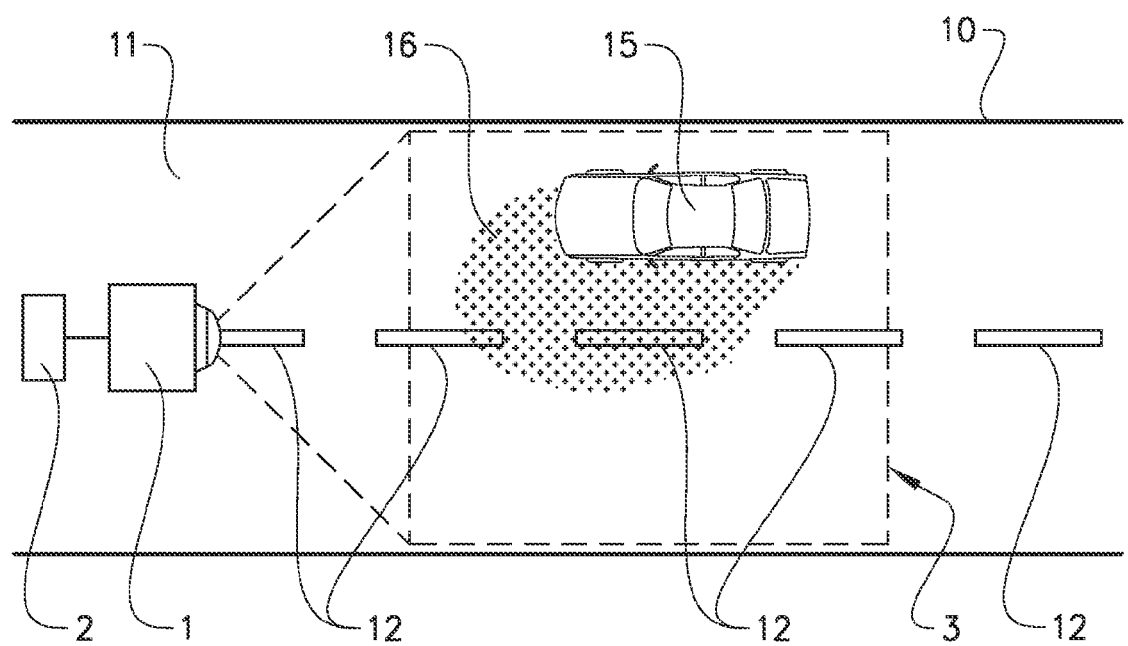
FIG. 4 shows a schematic overview of a set-up for shadow detection according to a method embodiment.

FIG. 4 shows a schematic overview of a set-up for shadow detection according to an aspect of the method. A multiple colour channel camera 1 is arranged above a road 10 comprising a dark roadway 11, such as asphalt, and light road markings 12. The camera 1 has a predefined capturing area 3 where the road 10 constitutes a background. In this example, there is a passing foreground object in the form of the car 15 within the capturing area 3. The car 15 casts a shadow 16. In various traffic surveillance applications, such as tunnel surveillance or road toll facilities, where passing vehicles are to be tracked and/or identified, it is important to be able to classify the shadow 16 which moves along with the car 15 as part of the background road 10 instead of as a foreground object. This can be achieved in an improved way by the disclosed method for shadow detection. The method is implemented in an electronic control unit 2 which is connected to the camera 1.

Figure 5A:
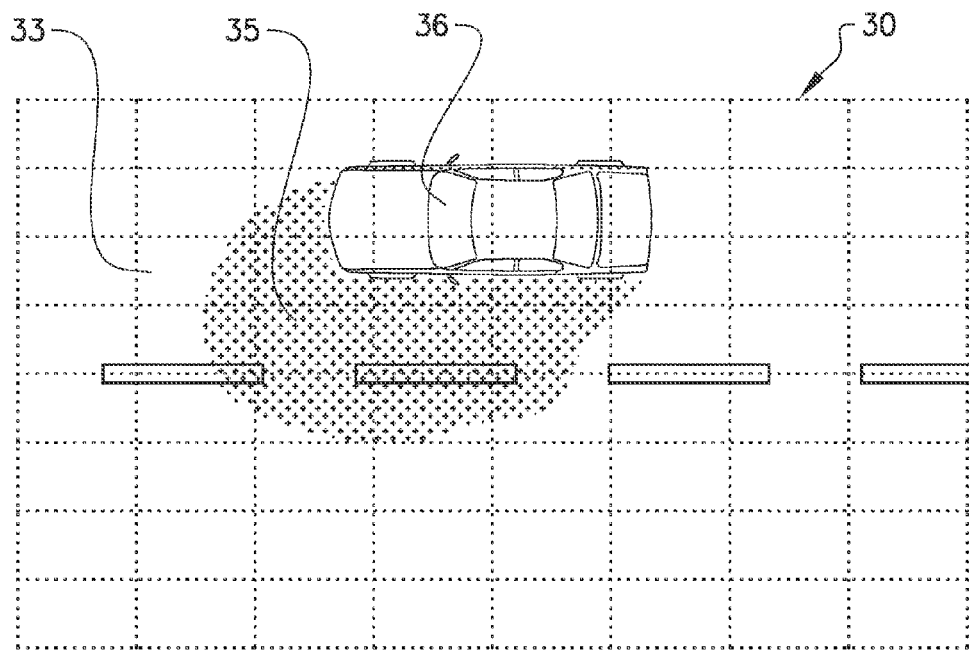
FIGS. 5a and 5b show an image and a background image, respectively, divided into a plurality of evaluation areas.
Figure 5B:
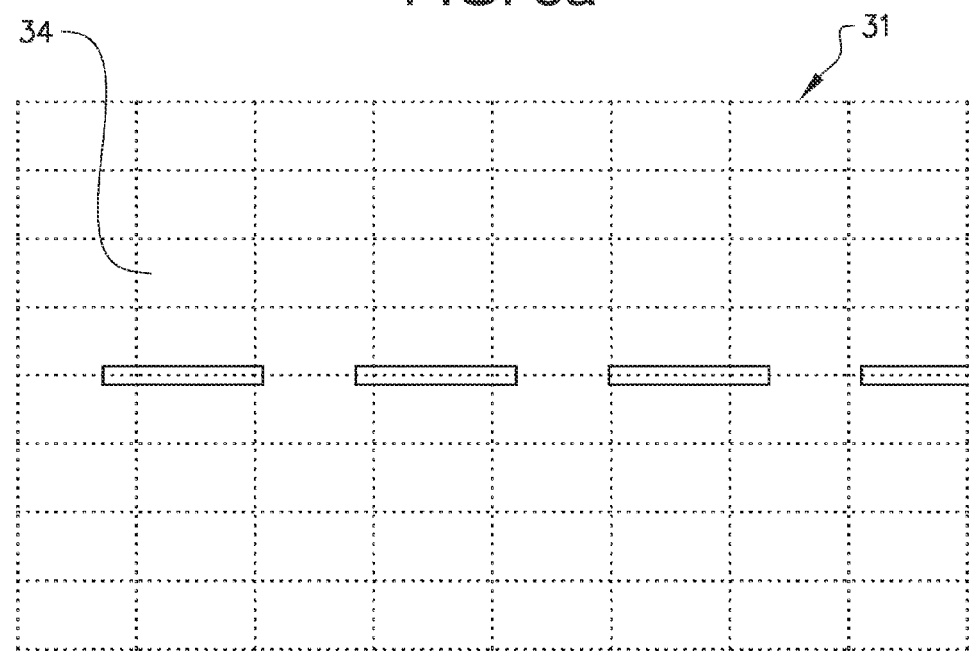

FIGS. 5a and 5b shows an image 30 divided into a plurality of image evaluation areas 33 and a background image 31 divided into a plurality of background image evaluation areas 34. The image 30 and the background image 31 show the same scene, in this example a roadway, but the image 30 further comprises a passing foreground object and its shadow. The image 30 and the background image 31 are divided into an equal number of image evaluation areas 33 and background image evaluation areas 34, such that each image evaluation area 33 in the image 30 has a corresponding background image evaluation area 34 in the background image 31.

In this schematic example, there are sixty-four evaluation areas 33, 34 in each image. However, in practice, dividing the images 30, 31 into only sixty-four evaluation areas 33, 34 would result in poor shadow detection since the image evaluation areas 33 are large enough to comprise both shadow, foreground and/or background as seen in FIG. 5a. In an example, each pixel should form an individual evaluation area 33, 34 in order to achieve high resolution shadow detection. However, to reduce the need for processing capacity and storage space, several pixels could also be bundled for example in groups of two, four or eight or any other number of pixels to form a larger evaluation area 33, 34. However, the bundling has to be done in the same way in both the image 30 and the background image 31 such that each image evaluation area 33 has its counterpart background image evaluation area 34, and the size of the evaluation areas 33, 34 should, for example, be limited such that a majority of evaluation area 33, 34 substantially contains only shadow, foreground or background type pixels. The shadow detection method can be performed in the following way for each image evaluation area:

Subtract the colour channel R, G, B values of the background image evaluation area 34 from the colour channel values R, G, B of the image evaluation area 33 in order to achieve a difference value for each colour channel R, G, B. In this example, the colour channels are red R, green G, and blue B, but any other colour space could also be used.

For each combination of two colour channels R, G, B, check if the corresponding pair of difference values falls within the defined shadow region 20, 23, 26 in the two-dimensional coordinate system 21, 24, 27 defined by the two colour channels R, G, B.

Classify the image evaluation area 33 as shadow if the pairs of difference values fall within the shadow region 20, 23, 26 for all combinations of two colour channels R, G, B. Otherwise, classify the image evaluation area 33 as non-shadow.

The above steps may, for example, be repeated for every image evaluation area 33 in the image 30. The method classifies shadowed image evaluation areas 35 as shadow, and foreground image evaluation areas 36 as non-shadow.

CONCLUSION

The invention is capable of modification in various obvious respects, all without departing from the scope of the appended claims. Accordingly, the drawings and the description thereto are to be regarded as illustrative in nature, and not restrictive.

Reference signs mentioned in the claims should not be seen as limiting the extent of the matter protected by the claims, and their sole function is to make the claims easier to understand.

What is claimed is:

1. A method for shadow detection in an image comprising multiple colour channels, wherein said image is compared with a background image and wherein said image and said background image:
    have an exposure of a common background,
    are divided into a plurality of image and background image evaluation areas respectively, each image evaluation area having a corresponding background image evaluation area covering the same area of said common background, and
    comprises the same multiple colour channels,
wherein each possible combination of two colour channels in said image is identified, each combination of two colour channels defines a two dimensional coordinate system, and a shadow region is defined in each of said coordinate systems, wherein for each image evaluation area to be evaluated the method comprises the steps of:
    for each combination of two colour channels:
        identifying a first value pair defining the values of said two colour channels in the image evaluation area,
        identifying a second value pair defining the values of said two colour channels in the corresponding background evaluation area, and
        checking if a difference value between said first and second value pairs falls within said shadow region in said coordinate system;
    classifying the image evaluation area as shadow if the difference value falls within the shadow region for all combinations of two colour channels; and
    classifying the image evaluation area as non-shadow if the difference falls outside the shadow region for any of the combinations of two colour channels.

2. The method according to claim 1, wherein each background evaluation area and each image evaluation area is an individual pixel.

3. The method according to claim 1, wherein each image evaluation area contained in the image is evaluated.

4. The method according to claim 1, wherein the shadow region for each combination of two colour channels is stored in a two-dimensional lookup table.

5. The method according to claim 1, wherein the image is captured by a stationary camera and wherein the background image is an average, a median or a peak of a predetermined number of previous images captured by said stationary camera.

6. The method according to claim 5, wherein the background image is created by averaging at least 500 previous images.

7. The method according to claim 6, wherein the background image is created by averaging at least 1000 images.

8. The method according to claim 5, wherein the background image is continuously updated.

9. The method according to claim 8, wherein the background image is updated at predetermined time intervals by replacing an oldest previous image by a newly captured image in the averaging of previous images.

10. The method according to claim 1, wherein the shadow regions are automatically constructed from a plurality of previous images where shadow regions of the plurality of previous images are predetermined.

11. The method according to claim 1, wherein the shadow regions are manually constructed.

12. The method according to claim 1, wherein the method further comprises a post-processing step of comparing an image evaluation area to its neighbouring image evaluation areas and correcting a shadow classification of the image evaluation area if its neighbourhood suggests misclassification.

13. A traffic surveillance facility provided with a multiple colour channel camera coupled to a computer, wherein shadow detection is carried out by said computer according to the method of claim 1.

* * * * *

UNITED STATES PATENT AND TRADEMARK OFFICE
CERTIFICATE OF CORRECTION

| | |
|---|---|
| PATENT NO. | : 9,183,457 B2 |
| APPLICATION NO. | : 14/321680 |
| DATED | : November 10, 2015 |
| INVENTOR(S) | : Björn Crona |

It is certified that error appears in the above-identified patent and that said Letters Patent is hereby corrected as shown below:

On the title page, in item (74), in column 2, in "Attorney, Agent, or Firm", line 1, delete "Finala" and insert -- Fiala --, therefor.

Signed and Sealed this
Twenty-second Day of March, 2016

Michelle K. Lee
*Director of the United States Patent and Trademark Office*